United States Patent
Wallace

[11] Patent Number: 6,073,502
[45] Date of Patent: Jun. 13, 2000

[54] POWER TAKEOFF DEVICE

[75] Inventor: Richard G. Wallace, Muncie, Ind.

[73] Assignee: Muncie Power Products, Inc., Muncie, Ind.

[21] Appl. No.: 09/045,022

[22] Filed: Mar. 20, 1998

[51] Int. Cl.[7] .......................... F16H 37/04; F16D 25/061
[52] U.S. Cl. ...................... 74/15.86; 192/69.9; 192/85 A
[58] Field of Search .......................... 74/15.86; 192/69.9, 192/85 A

[56] References Cited

U.S. PATENT DOCUMENTS

| | | |
|---|---|---|
| 2,630,872 | 3/1953 | Roos et al. .......................... 192/69.9 X |
| 2,997,136 | 8/1961 | Gaines et al. . |
| 3,041,884 | 7/1962 | Elfes . |
| 3,058,558 | 10/1962 | Hawk .................................. 192/69.9 |
| 3,231,057 | 1/1966 | Wolf .................................... 192/69.9 |
| 3,540,297 | 11/1970 | Wagner et al. . |
| 3,831,722 | 8/1974 | Deschaups . |
| 3,872,954 | 3/1975 | Nordstrom et al. . |
| 4,108,291 | 8/1978 | Zeuker . |
| 4,275,607 | 6/1981 | Snoy . |
| 4,388,843 | 6/1983 | Teeter . |
| 4,399,715 | 8/1983 | Dziuba et al. . |
| 4,573,366 | 3/1986 | Kennard . |
| 4,594,906 | 6/1986 | Vincent et al. . |
| 4,595,087 | 6/1986 | Morisawa et al. ..................... 192/85 A |
| 4,640,378 | 2/1987 | Dobberpuhl et al. . |
| 4,671,395 | 6/1987 | Dobberpuhl et al. . |
| 4,751,989 | 6/1988 | Shinokawa et al. . |
| 4,773,277 | 9/1988 | Cook et al. . |
| 4,811,614 | 3/1989 | Lasoen . |
| 4,944,193 | 7/1990 | Harada et al. . |
| 5,070,982 | 12/1991 | Pitchford . |
| 5,099,936 | 3/1992 | Irikura et al. . |
| 5,228,355 | 7/1993 | Smith et al. . |
| 5,494,142 | 2/1996 | Kale . |
| 5,542,306 | 8/1996 | Fernandez . |
| 5,549,185 | 8/1996 | Kale . |
| 5,601,172 | 2/1997 | Kale et al. . |

OTHER PUBLICATIONS

Muncie Power Products Catalog Brochure (Prior Art) "The New High Speed High Torque 82 Series PTO", Prior Mar. 2, 1998.

*Primary Examiner*—Allan D. Herrmann
*Attorney, Agent, or Firm*—Hall, Priddy & Myers

[57] ABSTRACT

A power takeoff of compact dimension yet capable of high horsepower output which includes a shifting mechanism, air actuated internally to connect internally aligned banks of splined gear members yet assures against inadvertent rotation of the output shaft without the need for a drag brake.

12 Claims, 2 Drawing Sheets

POWER TAKEOFF DEVICE

FIELD OF THE INVENTION

This invention relates to power takeoff devices. More particularly, this invention relates to power takeoff devices for high horsepower applications whose space requirements preclude bulky power takeoff devices from being employed.

BACKGROUND OF THE INVENTION

Power takeoff devices (hereinafter referred to as "PTOs") are well known throughout industry for their ability to transfer the power of a rotating gear of an engine (herein broadly referred to as a transmission) to which the PTO is attached, to an auxiliary function which performs useful work.

Perhaps the most prominent use for PTOs is on heavy duty trucks equipped with a hydraulic fluid pump for operating various auxiliary functions (i.e. equipment) ancillary to the truck's principal function as a transportation vehicle. Such auxiliary functions characteristically include, for example, hydraulically raising and lowering a dump bed through operation of an underbody dump hoist or the performing of high horsepower operations such as bulk powder dispensing by high speed blowers, hydraulic refuse compacting, winching and the like. In such applications, the PTO is characteristically connected to an appropriate gear of the transmission of the truck which selectively or constantly rotates when the engine is turned on. The PTO, having an output shaft which is then rotated by the transmission gear, generates the necessary horsepower to operate the hydraulic pump which then powers the auxiliary function at its designed workload (horsepower) requirement.

It is, of course, understood, in this respect, that not all PTOs are used on or in association with vehicles. Generally speaking, PTOs of the type contemplated by this invention are envisioned for use in association with any engine, movable or unmovable (vehicular or non-vehicular) having a gear which rotates with engine operation (selectively or constantly) and which may be connected (selectively or constantly) to a PTO according to this invention for rotating the PTO's output shaft. Thus when used herein, the term "transmission" includes not only vehicle drive transmissions, but any engine having a gear rotated by engine operation and capable of having a PTO according to this invention attached to it. Examples of such non-vehicular applications include engines which operate oil rigs, non-vehicular garbage compactors, and non-vehicular winches or bulk blowers.

Often conflicting, from a design perspective, with the need for high horsepower requirements in order to properly perform the auxiliary work required (e.g. bulk powder blowing, etc.), is the envelope of compliance allowed by the truck or engine generically at the location on and around its transmission to which the PTO must be secured. In short, there are simply times and applications when and where a PTO of the necessary size to provide the required horsepower does not fit.

In U.S. Pat. No. 5,542,306 there is disclosed a very advantageous and successful PTO particularly useful in the heavy duty trucking industry. This PTO includes an internally located clutch arrangement for engaging and disengaging the output shaft of the PTO from the transmission of the vehicle, along with an internally located drag brake assembly for preventing inadvertent rotation of the PTO's output shaft caused by clutch plate stickage, etc.

While highly advantageous for most usages, it has been found that for high horsepower applications, e.g. 60 hp or greater as measured at 1000 rpm (output shaft speed) generally equal to or exceeding about 300 lbs. ft., the clutch shift mechanism and drag brake of the PTO of this prior '306 patent must be designed to be of such a size that the resulting PTO is too large to fit into certain important smaller envelopes of compliance experienced in industry within which the PTO must fit. In this respect, of course, it would also be an advantage of any new shift mechanism if it could insure against inadvertent rotation of the PTO's output shaft while, at the same time, eliminating the need for a drag brake mechanism to perform this function, thus avoiding the expense, space, and maintenance time associated with such a drag brake assembly regardless of its size.

A particularly pronounced problem, in this respect, exists in the heavy duty tanker truck bulk blower (e.g. cement powder, sugar, etc.) art. In such usages there is normally experienced a need to provide particularly high horsepower requirements (e.g. typically 60 hp or more @ 1000 rpm), and yet the space (envelope of compliance) adjacent the PTO "window" on many truck chassis all too often does not permit use of a, heretofore, adequately sized PTO of the otherwise highly advantageous type found in the aforesaid '306 patent.

The reason for this size problem arises from the nature of gears, in general, and their relationship to the characteristic of horsepower. In this respect, horsepower is generally defined by the equation:

$$Hp = \frac{T(\text{rpm})}{k}$$

wherein T is torque, k is a constant (generally recognized as the quantity 5252), Hp is horsepower and rpm is the desired revolutions per minute of the output shaft of the PTO. Hp, of course, is characteristically specified according to the work requirement necessary to perform the auxiliary function (e.g. dispensing powder from the vehicle's tanker body, etc.).

As can be seen, if the envelope for size compliance in a vehicle (or an engine generically) regarding the attachment of a PTO to its transmission is relatively small, the need for the PTO to be of compact design will often conflict with the need to achieve high horsepower. This spacing requirement is exacerbated, for example, if, as in the aforesaid '306 patent, a clutch mechanism and drag brake are employed because, as can be seen from the above equation, when horsepower is increased, so is torque and/or rpm, thus necessitating a larger clutch and drag brake to accommodate the higher horsepower requirement. This, then, enlarges the PTO.

This spacing limitation is further exacerbated if, as in the past, the ultimate shifting mechanism for engaging the PTO with the relevant transmission gear resides, in large part, outside of the housing of the PTO, such as through a shifter cable control or external air shift controls, etc.

While the PTO of the aforesaid U.S. Pat. No. 5,542,306 solved this latter problem by including portions of the shifter mechanism internally, its internal shifting mechanism, as aforesaid, included a clutch plate assembly and a drag brake. When designed to handle high horsepower requirements, e.g. above about 60 hp @ 1000 rpm, the size of the clutch, together with the size of the other components, including the drag brake, have been found to increase the overall size of the ultimate PTO, despite locating a portion of the shift mechanism internally, so as to be too bulky to accommodate various useful envelopes of compliance, particularly on certain heavy duty trucks.

It is, therefore, apparent that there exists a need in the art for a PTO that can accommodate a wide variety of envelopes of compliance and, at the same time, produce sufficient horsepower to accomplish the auxiliary work required, while assuring against inadvertent rotation of the PTO's output shaft without the need for a drag brake assembly. It is, therefore, a purpose of this invention to fulfill this and other needs in the art which will become more apparent to the skilled artisan once given the following disclosure.

SUMMARY OF THE INVENTION

Generally speaking, this invention fulfills the above-described needs in the art by providing in a power takeoff device having a rotatable output shaft operatively engagable for rotation with a gear of a transmission, the power takeoff device being capable of producing sufficient horsepower to meet the operational requirements of an auxiliary function to be powered by the rotation of the output shaft;

the power takeoff device including a housing, the rotatable output shaft (having a longitudinal axis) which is at least partially located within the housing, and a mechanism for selectively connecting the output shaft for rotation to the transmission gear and disconnecting the output shaft for nonrotation from the transmission gear;

the improvement comprising as the mechanism for selectively connecting and disconnecting the output shaft to and from the transmission gear, the combination which includes:

an output gear rotatable about the output shaft and comprised of a first and a second bank of gear teeth radially spaced from and circumferentially extending at least partially (and preferably completely) around the longitudinal axis of the output shaft, the first bank of gear teeth being separated from the second bank of gear teeth longitudinally with respect to the longitudinal axis of the output shaft, the first bank of gear teeth being operatively connectable to the transmission gear and the second bank of gear teeth being selectively connectable to a connecting gear member;

the connecting gear member being nonrotatably attached to the output shaft and comprised of a bank of gear teeth radially spaced from and circumferentially extending at least partially around (and preferably fully around) the longitudinal axis of the output shaft and being located so as to be axially aligned with the second bank of gear teeth of the output gear and longitudinally separated therefrom so as to define a disconnect space therebetween;

a piston selectively slidable along and nonrotatably attached to the output shaft, the piston having a bank of gear teeth radially spaced from and circumferentially extending at least partially around (and preferably fully around) the longitudinal axis of the output shaft and axially aligned with the bank of gear teeth of the connecting gear member and with the second bank of gear teeth of the output gear, the gear teeth of the piston being of a size sufficient so as to be capable of spanning the disconnect space and to mesh with said bank of gear teeth of said connecting member and the second bank of gear teeth of the output gear thereby to operatively connect the output gear to the connecting gear member for rotation thereby of the output shaft.

In certain preferred embodiments, the connect/disconnect mechanism further includes an air actuating system for driving the piston into a connecting position spanning the disconnect space. In still further preferred embodiments a biasing spring is located between the piston and the connecting gear member for normally biasing the piston to a disconnect position.

In certain embodiments of this invention, moreover, the aforesaid output shaft is capable of generating a horsepower of at least about 60 hp at output shaft speeds of from about 1000–2500 rpm (e.g. 60 hp at 1000 rpm), yet still be capable of satisfying even unusually small envelopes of compliance due to the compact nature of the unit brought about by the above-described unique connect/disconnect non-clutch plate, non-drag brake requiring type of mechanism employed.

This invention will now be described with respect to certain embodiments thereof as illustrated in the following drawings, wherein:

IN THE DRAWINGS

DETAILED DESCRIPTION OF CERTAIN EMBODIMENTS OF THE INVENTION

Figure 1:
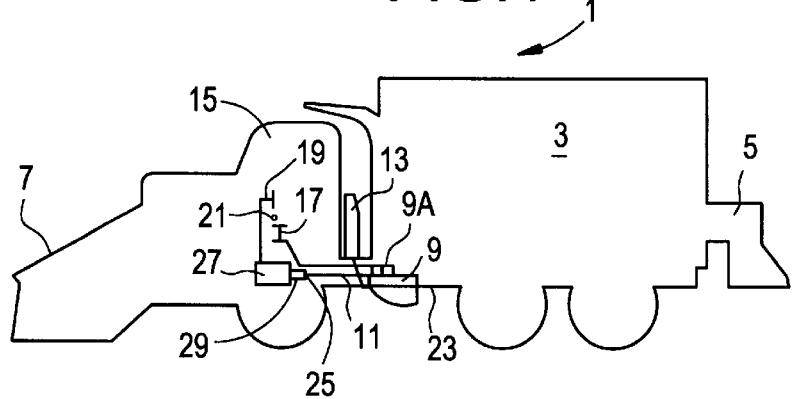
FIG. 1 is a side plan, schematized view of a truck having located thereon a PTO according to this invention.

FIG. 1 illustrates a typical heavy duty truck environment in which the subject invention finds utility. As shown, truck 1 is provided with a dump bed 3, a salt spreader 5, and a snow plow 7, each of which is to be operated using known, conventional mechanisms via hydraulic pump 9. Hydraulic pump 9, in further conventional fashion, is remotely mounted on the truck chassis 23 a distance away from power takeoff device 27 (the subject of this invention as described more fully hereinbelow). Connecting output shaft 29 of PTO 27 to pump 9 is rotatable extension shaft 11. Further provided in conventional fashion is a hydraulic fluid reservoir tank 13 operatively connected in known fashion for supplying the fluid which operates the various auxiliary functions via pump 9.

While FIG. 1 illustrates a typical "remote mount" PTO/pump configuration, it is understood that this invention is equally applicable to conventional "direct mount" PTO/pump configurations wherein the pump is directly mounted to the output stub end 25 of output shaft 29 of the PTO, rather than being connected thereto by an extension shaft 11 as shown in FIG. 1. In addition, it is understood that the PTO of this invention is applicable to a wide variety of uses and truck types within the trucking industry as that term is used generically in the art (examples aforementioned).

Located in cab 15 of truck 1 are the separate controls for operating power takeoff 27 and hydraulic pump 9. In this respect, the controls are schematically illustrated to generically represent a variety of controls that may be employed. For example, controls 17 for hydraulic pump 9 may be a conventional pull cable (or plural cables) or a lever arm rod(s) which conventionally is linked to spool valve(s) 9 A that control the flow, and its direction, of hydraulic fluid to the various auxiliary features 3, 5, and/or 7 on the truck. Other types of controls contemplated include electronic solenoid operated controls and air actuated controls.

In like manner, power takeoff control 19, accompanied by its requisite warning light 21, is conveniently located in cab 15. In one embodiment of this invention power takeoff control 19 is a switch mechanism of known design according to the air actuating system illustrated in FIG. 3 or FIG. 4 (and described more fully below).

As stated above, it is understood that the auxiliary functions illustrated in FIG. 1 are only a few of a wide variety of functions operable by PTOs according to this invention. Examples of others, such as bulk blowers (e.g. for dispensing bulk sugar, powdered cement, etc. from a container body or chassis 23 rather than the dump body 3 as illustrated), winches, garbage compactors and the like are well known in the art, and contemplated for use herein.

Figure 2:
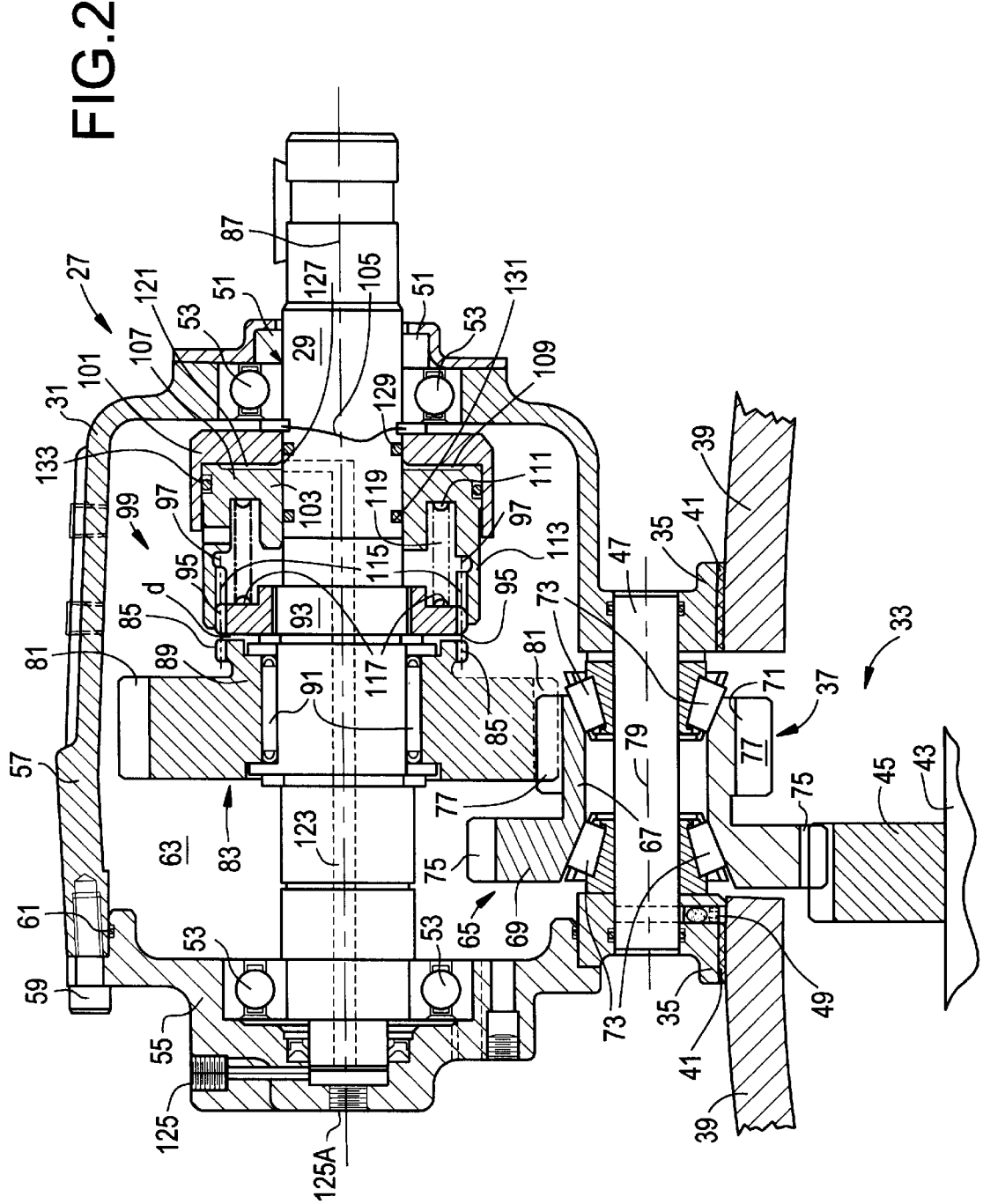
FIG. 2 is a side plan, partially sectionalized view of an embodiment of a PTO according to this invention as may be used on the truck of FIG. 1.

With reference now to FIG. 2, there is illustrated therein an embodiment of a PTO as contemplated by this invention. Therein PTO 27 includes, in conventional fashion, a walled housing 31 for retaining the internal PTO mechanism and lubricating fluid from the transmission of an engine generally illustrated at 33. In FIG. 2, PTO 27 is illustrated in conventional fashion as being attached (usually by six bolts, not shown for convenience) at flange 35 to a "window" 37 or opening provided in the external wall 39 of a typical transmission 33 (partially illustrated schematically). Flange 35 extends as a frame around window 37 and, in usual fashion, a sealing gasket 41 is provided between flange 35 and walls 39.

In further conventional fashion, transmission 33 is provided with shaft 43 having mounted thereon a transmission gear 45 which conventionally rotates upon engine operation (e.g. in a truck, the gear which is either on the main or countershaft 43 and designed by the transmission manufacturer to receive the PTO). FIG. 2, with respect to the transmission and its gear, is schematically presented for general reference purposes, since transmissions may come in a wide variety of types and the connection of a PTO to a particular transmission gear is conventional and well known in the PTO art, all of which are contemplated for use in accordance with this invention.

As now further illustrated in FIG. 2, a PTO 27, according to this invention, is operatively and selectively connectable to transmission gear 45 via a series of interrelated gears comprised of banks of gear teeth radially spaced from and circumferentially extending around, in a first instance an idler shaft 47, and in a second instance a PTO output shaft 29. Each shaft 47 and 29, respectively, is retained at its opposing end by the walls of housing 31 in a known way. As shown, idler shaft 47 is nonrotatably mounted in housing 31 via set screw 49. On the other hand, output shaft 29 is rotatably mounted in housing 31 via a series of shaft seals (e.g. item 51) and bearings 53, all in known fashion.

In this respect, housing 31 may be formed of a face plate 55 and a rear, walled cavity container 57, tightly sealed against loss of fluid via a plurality of sealing screws 59 and a sealing ring 61. As aforesaid, cavity 63 thereby defined, houses the internal mechanism for selectively engaging and disengaging output shaft 29 to and from transmission gear 45, as well as maintaining a fluid tight seal for retaining the transmission fluid which flows from transmission 33 through window 37 into cavity 63 after PTO 27 is attached to transmission 33, thereby serving to lubricate the internal parts of PTO 27.

With specific attention now to the internal linkages which are used to selectively connect or disconnect transmission gear 45 to output shaft 29, thereby selectively rotating shaft 29 upon rotation of gear 45 without the need for a clutch plate assembly or for a drag brake to prevent the inadvertent rotation of shaft 29, there is first presented input cluster gear 65. Input cluster gear 65 includes a shaft section 67 which separates a "customer" gear bank 69 from an input "ratio" gear bank 71. Shaft 67 is rotatably located on idler shaft 47 by conventional tapered roller bearings 73. Both "customer" gear bank 69 and input "ratio" gear bank 71 comprise a plurality of evenly spaced gear teeth 75 and 77, respectively, radially spaced from longitudinal axis 79 of idler shaft 47 and circumferentially extending around shaft 47.

The choice of pitch, size and number of gear teeth provided in the various PTO gear banks of this invention, once given this disclosure, in order to achieve a given output speed (of shaft 29) and horsepower requirement (and thus to accept a given torque) are well known to the skilled artisan in PTO design. Conventional pitch and gear sizes useful herein include, for example, typical 6.45 pitch spur gears and ⅝ pitch spur gears matchable with and found in various heavy duty truck transmission gears represented by gear 45. It is, of course, understood that such choices of design will vary, given the nature of the ultimate application, transmission, and horsepower needs, etc.

In the embodiment illustrated in FIG. 2 customer gear bank 69 is constantly in meshed engagement with transmission gear 45 and input ratio gear bank 71 is constantly in meshed engagement with the first bank of gear teeth 81 in cluster output gear 83. Cluster output gear 83 further includes a second bank of gear teeth 85. Banks 81 and 85 are longitudinally separated from each other with respect to longitudinal axis 87 of output shaft 29 by connecting shaft 89. Output gear shaft 89 is mounted on output shaft 29 for rotation thereabout and for this purpose is provided with needle bearings 91, in known fashion, for efficient rotation.

In FIG. 2 there is illustrated an embodiment of a mechanism for selectively engaging and disengaging shaft 29 with gear 45, which mechanism replaces the space consuming clutch/drag brake mechanism in U.S. Pat. No. 5,542,306, thus enabling the unique results achieved herein as aforementioned. This selectively engaging and disengaging mechanism includes a connecting gear member 93 nonrotatably attached (e.g. by circumferential splines) on output shaft 29. Member 93 is provided with a bank of (i.e. a plurality of) gear teeth 95 radially spaced from and circumferentially extending around the longitudinal axis 87 of output shaft 29. Bank of teeth 95 is also located, as illustrated via graphic line 97, so as to be axially aligned with second bank of teeth 85 in output cluster gear 83.

This unique engaging and disengaging mechanism further includes a piston 99 comprised of a piston cup 101 and a piston head 103. Piston cup 101 is nonslidably and nonrotatably attached (as by splines) to shaft 29. Piston head 103 is slidably, but nonrotatably (again, as by splines), attached to shaft 29. Both cup 101 and head 103 will rotate with and whenever shaft 29 rotates, but will not rotate if shaft 29 does not rotate (similarly as connecting gear member 93's spline or other connection to shaft 29 functions). Cup 101 does not slide on shaft 29 and indeed is prevented from doing so by an appropriate connection aided by fluid seal 105 which also rotates whenever (but only when) shaft 29 rotates.

As shown in FIG. 2, piston head 103 is comprised of a body portion 107 having a rear wall 109 and a forward wall 111 from which extends an internally splined circumferential cylindrical wall 113. Formed in its splined area are a plurality of gear teeth 115 axially aligned with gear teeth 95 and 85, respectively (as illustrated by graphic line 97). In turn, connecting gear member 93 is provided with a rear wall 117 such that shaft 29, forward wall 111, circumferential wall 113 and rear wall 117 cooperate to define a cavity therebetween. Located in this cavity and extending between forward wall 111 and rear wall 117 is a cylindrical coil spring 119 which normally biases gear teeth (i.e. internal splines) 115 rearward and out of engagement with gear teeth 85 (e.g. preferably pulled back sufficiently far into gear teeth 95 so as to have no possibility of inadvertently spanning the disconnect space "d" between gear teeth 95 of connecting gear member 93 and gear teeth 85 of cluster output gear 83 thereby to insure against inadvertent rotation of output shaft 29 and thus avoid the need for a drag brake in this regard).

An air cavity 121, circumferential in nature and consuming a relatively large area of rear wall 109, but of relatively shallow depth, is formed in rear wall 109. To be sure of a uniform sliding operation of piston head 103, cavity 121 should extend reasonably radially uniformly in and around wall 109 with respect to shaft 29 and with regard to its axis 87. Cavity 121 is, in turn, operatively aligned for emitting and evacuating air thereto/therefrom with air orifice 123 extending through output shaft 29.

As further illustrated, air orifice 123 has an air entrance port 125 and an exit end 127 (into cavity 121). Sensor port 125 A can optionally be provided along with a sensor 145 (FIG. 3, 4) of known type to indicate whether piston 99 is in its connect (i.e. shaft rotation) or disconnect (i.e. no shaft rotation) mode. For example, as disclosed in U.S. Pat. No. 5,542,306, sensor port 125A having the sensor therein may lead to a warning light 21 located in the cab of a truck (FIG. 1) to advise the operator as to whether the PTO shaft is rotating or not.

In order to insure air integrity of the system various O-ring seals 129, 131, 133 are provided in the system as illustrated in FIG. 2. Such seals are conventional in the art and are made of conventional polymeric material and in this design are, as can be seen (and as shown in aforesaid U.S. Pat. No. 5,542,306), located in circumferential cavities formed in their respective retaining element (e.g. shaft 29) so as not to be subjected to rotational wear forces, with only O-rings 131 and 133 being subjected to sliding wear forces. As illustrated O-ring seal 129 is subjected to neither sliding nor rotational wear forces.

In a typical operation, with the engine turned on, gear 45 may or may not be continuously rotating when the engine (of shown) is running, depending on the type engine and/or transmission involved. In most instances, however, gear 45 will continuously rotate when the engine is turned on. Assuming, for purposes of an exemplar operation of a vehicle provided with this invention, that the engine is running and gear 45 is turning, output gear 83 is thus rotating, while output shaft 29 is not, because as shown in FIG. 2, the PTO is in its disconnect mode (i.e. gear teeth 115 are biased away from spanning disconnect space "d" so as not to connect gear teeth 95 with gear teeth 85). It has been found that by providing an appropriate distance "d" and a biasing spring 119 of appropriate size, there is no need for a drag brake assembly to insure against inadvertent output shaft rotation to any significant extent. To now engage PTO shaft 29 for rotation by transmission gear 45, gear 45 must first be stopped from rotating (by any means such as by applying the brakes of the vehicle, etc., all in a known way). This places the system in readiness for output shaft engagement.

Figure 3:
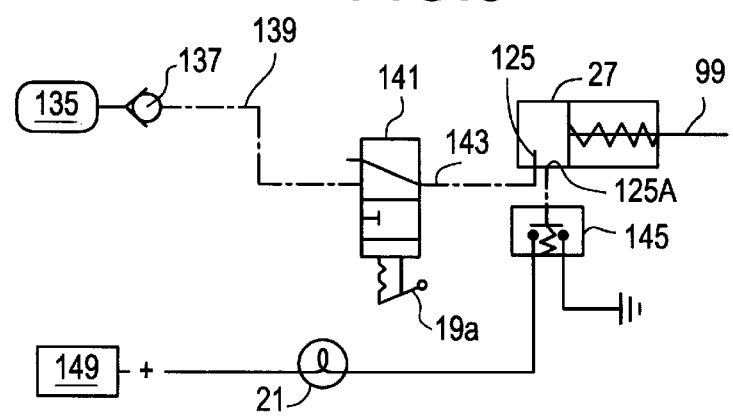
FIG. 3 is a schematic of an embodiment of an air control system which may be used in combination with the PTO of FIG. 2 to shift the PTO into its output shaft rotational mode.
Figure 4:
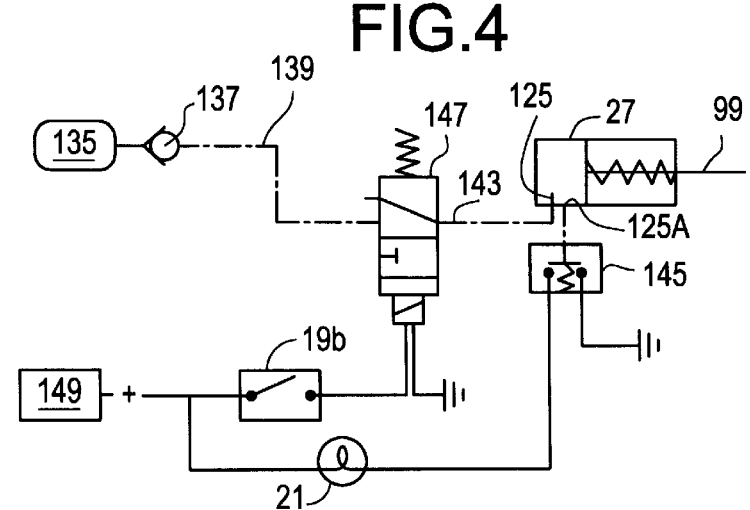
FIG. 4 is a schematic of another embodiment of an air control system useful with the PTO of FIG. 2.

Reference now is to FIG. 3 or FIG. 4 (explained more fully below) which show alternative control means for sending air under pressure via port 125 and orifice 123 to air cavity 121. By actuating these control means, and thus causing pressurized air to flow, piston head 103 slides forward against the compression of coil spring 119, and causes gear teeth 115 to operatively span distance "d" thereby connecting teeth 95 with teeth 85. By now rotating transmission gear 45 once again, shaft 29 is caused to rotate at the desired speed governed by the rotational speed (rpms) of gear 45 and the designed in ratio of the gears interlinking gear 45 to shaft 29 as described above. Thereafter, by reversing the procedure; namely, stopping the rotation of gear 45 and evacuating air from the system via the control means of FIG. 3 or FIG. 4, the normal bias of coil spring 119 will return piston head 103 to its disconnect position whereby gear teeth 95 are retracted across distance "d" to the position shown in FIG. 2. At that time, re-rotation of gear 45, while causing gears extending up to and including gear 83 to once again rotate, can not cause connecting gear member 93 or shaft 29 to rotate in a safe and effective way, regardless of the torque created by rotating output gear 83, and without the need for a space consuming drag brake assembly as shown in aforesaid U.S. Pat. No. 5,542,306.

While the control means employed may take many forms, two different exemplars are illustrated in FIGS. 3 and 4.

With reference first to the controls illustrated in FIG. 3, the system includes a source of pressurized air (e.g. 70 psi or greater) which on a heavy duty truck employing air brakes may conveniently be the pressurized air tank 135 associated therewith, which for safety purposes employs a check valve 137 of known design. Air line 139 is connected to manual control valve 141 operated by manual control 19a (i.e. control handle 19 located in the cab of the truck in FIG. 1). Control valve 141 is, in turn, connected to air inlet port 125 of PTO 27 by air line 143. As schematically illustrated, by appropriate manual manipulation of valve 141, air under pressure from air tank 135 can be sent to cavity 121 for PTO shaft engagement purposes, or evacuated from cavity 121 for disengagement purposes.

optionally provided in sensor port 125A of PTO 27, as aforesaid, is a pressure sensor 145 of known type which is connected with indicator light 21 located in the cab of the vehicle (see FIG. 1) for indicating to the vehicle operator that there is pressure in line 123 and thus rotation of shaft 29. Light 21 is, in this respect, conventionally connected to the battery of the vehicle (e.g. a 12 volt d.c. battery).

With reference now to FIG. 4 in which like parts are given the same numbers as in FIG. 3, the only difference is in the replacement of manual controls with electronic controls comprised of a solenoid control valve 147 and a rocker switch 19b located in the cab of the vehicle in place of control 19 (see FIG. 1). Air from tank 135 flows via now activated solenoid which shifts the control valve to allow air to flow via line 143 to cavity 121. To disconnect the PTO shaft from rotation, rocker switch 121 is turned "off", shifting the solenoid valve 147 to vent air from cavity 121 and orifice 123. Light 21 functions in the same manner as described above with respect to FIG. 3.

A comparison of examples from the operation of equivalent units, one employing a clutch operated, drag brake PTO according to a commercial embodiment of U.S. Pat. No. 5,542,306, and the other employing an embodiment of this invention, is now presented. The "ratio" reported is a conventional term in the art and refers to the number of gear teeth in input ratio gear bank 71 divided by the number of gear teeth in the first bank 81 of output gear 83 rounded off to the most significant figure (e.g. 0.47 =a ratio of "05"). Four PTO units having different "ratios" are compared. In each comparative example the size of the respective gears was the same, the units differing only in the use of a clutch/drag brake assembly vs. the connect/disconnect assembly of this invention.

TABLE

| EX. | RATIO | NO. TEETH INPUT RATIO GEAR | NO. TEETH OUTPUT GEAR | Horsepower* '306 PATENT | Horsepower* THIS INVENTION | % INCREASE ACHIEVED |
|---|---|---|---|---|---|---|
| 1 | 05 | 18 | 38 | 57 | 76 | +33% |
| 2 | 07 | 23 | 33 | 57 | 76 | +33% |
| 3 | 09 | 26 | 30 | 52 | 71 | +37% |
| 4 | 12 | 30 | 26 | 52 | 62 | +19% |

*@ 1000 rpm, PTO output shaft speed

As can be seen from the above, given the same size gear banks, and by replacing the clutch mechanism of the '306 patent with the unique connect/disconnect mechanism of this invention, a significantly higher amount of horsepower may be achieved for the same size housing. Stated another way, in order for the prior art device of the aforesaid '306 patent to achieve the same horsepower capabilities its clutch plate mechanism would have to be substantially enlarged and, of course, a drag brake assembly employed. This, in turn, would require the enlargement of the overall size of the PTO to an extent which, in practice, has been found to eliminate the ability to use the '306's clutch operated drag brake PTO in certain operations where space is a limiting factor and higher horsepowers are required.

Once given the above disclosure many other features, modifications and improvements will become apparent to the skilled artisan. Such other features, modifications and improvements are therefore considered to be a part of this invention, the scope of which is to be determined by the following claims:

I claim:

1. In a power takeoff device having a rotatable output shaft operatively engagable for rotation with a gear of a transmission, said power takeoff device being capable of producing sufficient horsepower to meet the operational requirements of an auxiliary function to be powered by the rotation of said shaft;

said power takeoff device including a housing, a said rotatable output shaft having a longitudinal axis and being at least partially located within said housing, and a mechanism for selectively connecting said output shaft for rotation to said transmission gear and disconnecting said output shaft for nonrotation from said transmission gear;

the improvement comprising as said mechanism for selectively connecting and disconnecting said output shaft to and from said transmission gear, the combination including:

an output gear rotatable about said output shaft and comprised of a first and a second bank of gear teeth radially spaced from and circumferentially extending at least partially around the longitudinal axis of said output shaft, said first bank of gear teeth being separated from said second bank of gear teeth longitudinally with respect to the longitudinal axis of said output shaft, said first bank of gear teeth being operatively connectable to said transmission gear and said second bank of said gear teeth being selectively connectable to a connecting gear member;

a said connecting gear member nonrotatably attached to said output shaft and comprised of a bank of gear teeth radially spaced from and circumferentially extending at least partially around the longitudinal axis of said output shaft and being located so as to be axially aligned with said second bank of gear teeth of said output gear and longitudinally separated therefrom so as to define a disconnect space therebetween;

a piston selectively slidable along and non-rotatably attached to said output shaft, said piston have a bank of gear teeth radially spaced from and circumferentially extending at least partially around the longitudinal axis off said output shaft and axially aligned with said bank of gear teeth of said connecting gear member and said second bank of gear teeth of said output gear, said gear teeth of said piston being of a size sufficient so as to be capable of spanning said disconnect space and of meshing with said bank of gear teeth of said connecting gear member and said second bank of gear teeth of said output gear thereby to operatively connect said output gear to said connecting gear member for rotation of said output shaft.

2. A power takeoff device according to claim 1 wherein said device further includes an orifice longitudinally extending through said output shaft, said orifice having a first opening at one end thereof for receiving air under pressure and a second opening at the other end thereof in communication with said piston at a location such that when air under pressure is applied through said orifice, said piston is caused to slide along said output shaft.

3. A power takeoff device according to claim 2 wherein said piston is comprised of a piston cup attached to said shaft so as to rotate therewith and having a forward wall, and a piston head having a rear wall, and a cavity located between said forward wall of said piston cup and said rear wall of said piston head, said cavity being in air flow communication with said second opening of said orifice in said shaft.

4. A power takeoff device according to claim 1 wherein said device further includes means for selectively sliding said piston a sufficient distance along said output shaft in a first direction to cause said gear teeth of said piston to span said disconnect space and for sliding said piston a sufficient distance along said output shaft in a second direction opposite said first direction to cause said gear teeth of said piston to be located at a distance spaced from said disconnect space.

5. A power takeoff device according to claim 1 wherein the gear ratios in said banks of gears are of such a number and said gears are of such a size as to be capable of being operated at an output shaft speed of at least 1000 rpm and producing a horsepower output of at least 60 hp.

6. In combination, a vehicle having an engine, a transmission operably connected to said engine and having therein a transmission gear rotatable by said engine for attaching a power takeoff device thereto, and the power takeoff device according to claim 1 operatively attached to said gear of said transmission such that when said transmission gear is rotated by said engine and said piston is selectively operated to connect said output gear to said connecting gear, said output shaft is caused to rotate.

7. The combination of claim 6 wherein said combination further includes means for selectively sliding said piston a sufficient distance along said output shaft in a first direction to cause said gear teeth of said piston to span said disconnect space, and for sliding said piston a sufficient distance along said output shaft in a second direction opposite said first direction to cause said gear teeth of said piston to be located at a distance spaced from said disconnect space.

8. The combination of claim 7 wherein said power takeoff device further includes an orifice longitudinally extending through said output shaft, said orifice having a first opening at one end thereof for receiving air under pressure and a second opening at the other end thereof in communication with said piston at a location such that when air under pressure is applied through said orifice, said piston is caused to slide along said output shaft.

9. The combination of claim 8 wherein said piston is comprised of a piston cup attached to said shaft so as to rotate therewith and having a forward wall, and a piston head having a rear wall, and a cavity located between said forward wall of said piston cup and said rear wall of said piston head, said cavity being in air flow communication with said second opening of said orifice in said shaft.

10. The combination of claim 9 wherein said connecting gear member has a rear wall and said piston head has a forward wall, said piston head having said bank of gear teeth of said piston located at an end thereof, and wherein said combination further includes a compressible and expandable spring member located between said rear wall of said connecting gear member and said forward wall of said piston head normally biasing said bank of gear teeth of said piston out of meshing engagement with said bank of gear teeth of said output gear in alignment therewith and at a distance from said disconnect space thereby to prevent any rotation of said output shaft when said bank of gear teeth of said piston are so normally biased by said spring member.

11. The combination of claim 10 wherein said piston head comprises a cup-shaped member comprised of an internal cylindrical wall and having said piston gear teeth circumferential located in said internal cylindrical wall and in constant meshing engagement with said gear teeth of said connecting member.

12. The combination of claim 11 wherein said spring member resides in a cavity defined by said cylindrical wall of said cup-shaped member.

* * * * *